US006889157B2

(12) United States Patent
Mutchler et al.

(10) Patent No.: US 6,889,157 B2
(45) Date of Patent: May 3, 2005

(54) AUTOMATED METHOD FOR INSTALLING AND CONFIGURING A TEST SUITE ON A UNIT UNDER TEST

(75) Inventors: Shad L. Mutchler, Sioux City, IA (US); Dennis K. Paulsen, Anthon, IA (US); Christopher M. Langdon, Sioux City, IA (US)

(73) Assignee: Gateway, Inc., Irvine, CA (US)

( * ) Notice: Subject to any disclaimer, the term of this patent is extended or adjusted under 35 U.S.C. 154(b) by 124 days.

(21) Appl. No.: 10/105,675

(22) Filed: Mar. 25, 2002

(65) Prior Publication Data

US 2003/0182074 A1 Sep. 25, 2003

(51) Int. Cl.[7] .............................................. G06F 19/00
(52) U.S. Cl. ..................................... 702/119; 702/123
(58) Field of Search ................................ 702/117, 119, 702/120, 121, 123; 700/96, 107, 108, 109, 110; 707/1, 10, 104.1, 200; 709/100, 200, 213, 220, 222, 224, 322, 323, 324, 325, 326, 327; 713/1; 714/46, 38; 717/120, 121, 124, 125, 126, 130, 131, 134, 135

(56) References Cited

U.S. PATENT DOCUMENTS

| | | |
|---|---|---|
| 5,864,660 A | 1/1999 | Hamameh et al. .... 395/183.098 |
| 5,983,022 A | 11/1999 | Watkins et al. ............. 395/708 |
| 5,987,625 A | 11/1999 | Wolff ........................... 714/36 |
| 6,002,868 A | 12/1999 | Jenkins et al. |
| 6,009,406 A | 12/1999 | Nick ............................ 705/10 |
| 6,029,257 A | 2/2000 | Palmer ........................ 714/40 |
| 6,138,249 A | 10/2000 | Nolet ........................... 714/25 |
| 6,138,252 A | 10/2000 | Whitten et al. ............... 714/46 |
| 6,247,128 B1 * | 6/2001 | Fisher et al. ................. 713/100 |
| 6,269,319 B1 * | 7/2001 | Neisch et al. ................ 702/118 |
| 6,304,982 B1 * | 10/2001 | Mongan et al. ............... 714/38 |
| 6,385,739 B1 * | 5/2002 | Barton et al. .................. 714/25 |
| 6,473,707 B1 * | 10/2002 | Grey ........................... 702/123 |
| 6,587,960 B1 * | 7/2003 | Barford et al. ................ 714/8 |

FOREIGN PATENT DOCUMENTS

| | | | |
|---|---|---|---|
| EP | 0 468 625 A2 | 1/1992 | ............ G06F/9/44 |
| EP | 0 468 625 B1 | 1/1992 | ........... G06F/9/445 |
| EP | 0 468 625 A3 | 1/1992 | ........... G06F/9/445 |
| EP | 1 089 179 A1 | 4/2001 | |

* cited by examiner

Primary Examiner—John Barlow
Assistant Examiner—Douglas N Washburn
(74) Attorney, Agent, or Firm—Chad W. Swantz; Suiter-West

(57) ABSTRACT

A method of installing and configuring a test suite for a unit under test in an automated assembly process uses an identifier of the unit under test to retrieve the test files and other files for the installation and configuration. The identifier may be a serial number. The method uses the identifier to call up a Bill of Materials. From the Bill of Materials, test files and other files are generated.

9 Claims, 8 Drawing Sheets

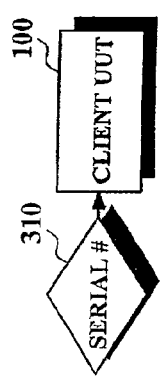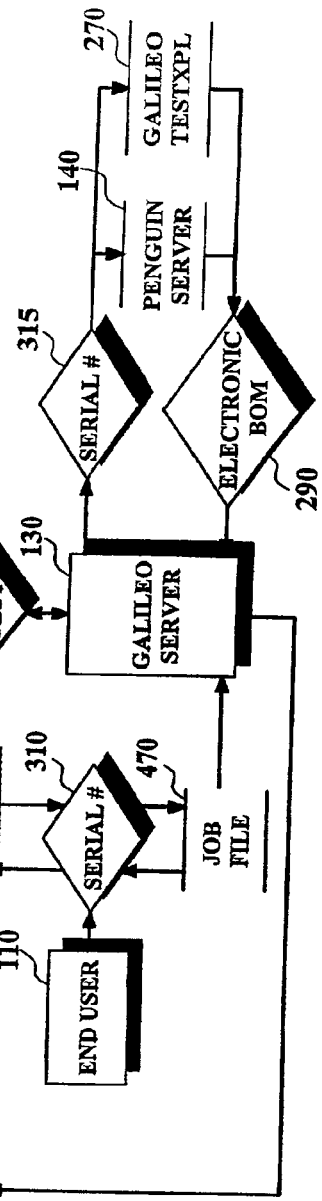
FIG. 4A
FIG. 4B

AUTOMATED METHOD FOR INSTALLING AND CONFIGURING A TEST SUITE ON A UNIT UNDER TEST

FIELD OF THE INVENTION

This invention generally relates to the field of software testing and installation, and specifically, to an automated method for installing and configuring a test suite on a unit under test.

BACKGROUND OF THE INVENTION

To achieve greater efficiency in processing and lower costs, computer assembly has become increasingly automated. To achieve reliability of performance, it is desirable to test the computer immediately after assembly and loading of the software. Test suites are used to perform the testing.

An existing method for installing and configuring a test suite uses a static, all-in-one CD solution. This prior art method requires the user to supply either test configurations, a parts list, or a parts list file to configure the test suite.

Therefore, there is a need to be able to reliably and quickly install the latest version of the test suite to a system without making any changes to the configuration of the system or loading/removing drivers on the system.

SUMMARY OF THE INVENTION

The present invention provides a method for installing and configuring a test suite for a unit under test. Almost all of the batch files and executables are located on the server so that when a change needs to be made to the test suite, it does not require making a new CD. Since all network activity is done on the operating system such as DOS, no configuration is necessary in an application such as Windows, leaving the image of the system unchanged, with the exception of the addition of the test suite. Since the files are pulled from a network, the test is easily modifiable in the event something needs to be changed. Tests may also be added or removed as necessary. Test cases are generated automatically based on a valid serial number supplied by the user.

In a first aspect of the present invention, a method is disclosed of installing and configuring a test suite for a unit under test device which includes the steps of receiving an identifier which uniquely identifies the unit under test device and installing and configuring test files for the unit under test device in which the test files are determined by the identifier.

In a second aspect of the present invention, a system is disclosed for configuring a unit under test device using a network which includes a first unit under test device, a first server communicatively coupled to the unit under test device, and a test suite server on a first network which communicates with the first server and the first unit under test device, the first unit under test device and the first server not being on the first network.

The present invention provides a means to install and configure a test suite on a variety of platforms that allow the dynamic evolution of a test suite in the manner of a manufacturing environment while still allowing the use of the bill of materials (BOM) to configure hardware tests. All of this is done unobtrusively, without making changes to the way the operating system is set up on the target system.

The present invention creates an architecture and process flow that finishes installing and configuring a test suite in a relatively short time (less than 3 minutes) and allows for better resource utilization.

The present invention configures a unit under test's (UUT) test case files automatically by interfacing with the client's order via a data store such as Information Technology's data store.

The present invention uses a friendly and intuitive interface design to minimize operator induced complications.

There is no floppy drive dependency.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIGS. 4A and 4B illustrate data flow of the client;

DETAILED DESCRIPTION OF THE INVENTION

Figures 1, 2:
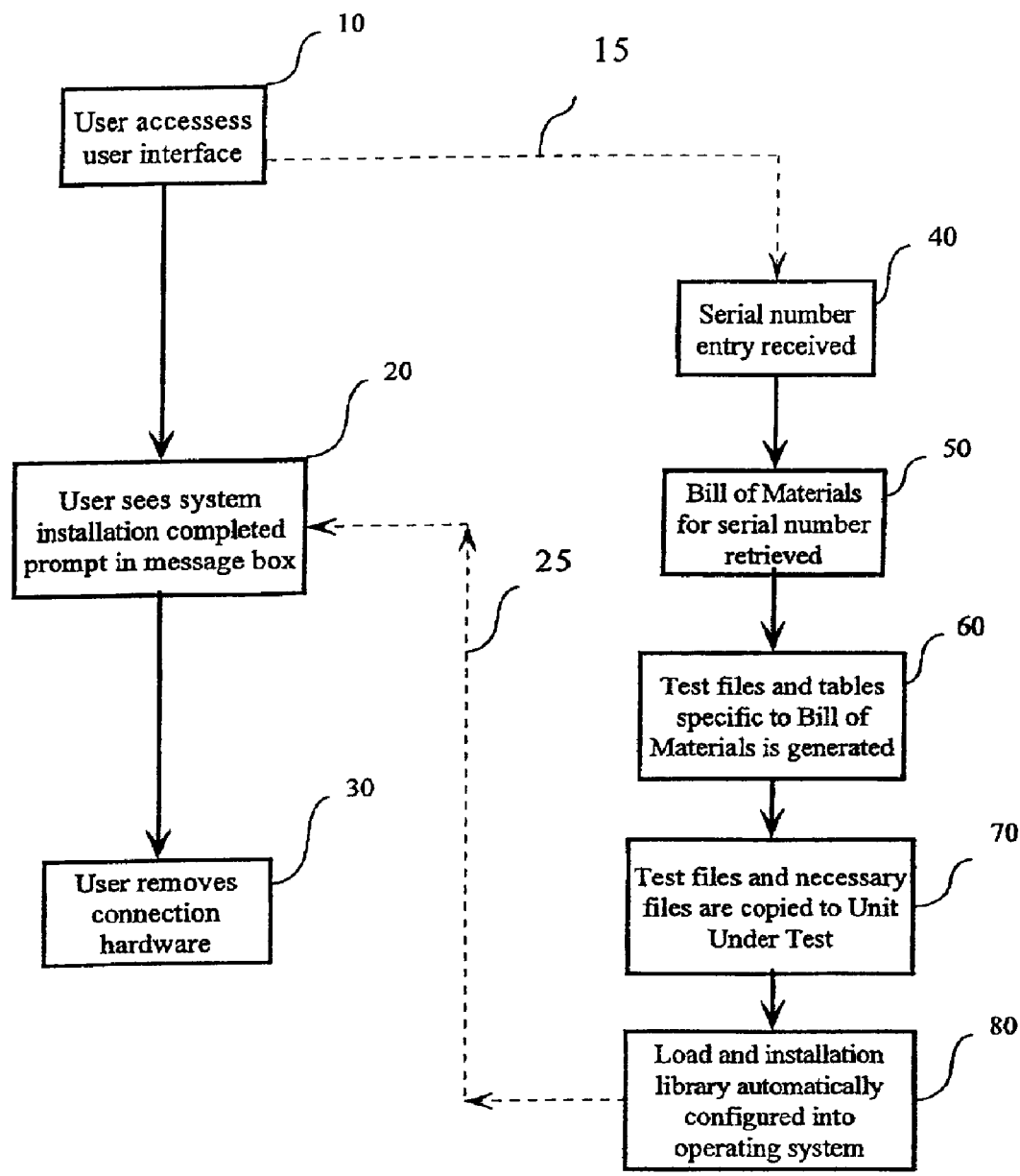
FIG. 1 illustrates a flow chart of user method steps for installing the test suite.
FIG. 2 illustrates the automated steps in installing the test suite for the unit under test device.

Reference will now be made in detail to the presently preferred embodiments of the invention, examples of which are illustrated in the accompanying drawings.

Referring generally now to FIGS. 1 through 9, exemplary embodiments of the present invention are shown The present invention relates to a method of installing and configuring Auto Test on a variety of platforms and still use the bill of materials to configure the hardware tests. To initiate this process, the user inserts the single bootable CD applicable to the target system and boots the system. It may be possible to use a set of bootable CDs to perform the installation and configuration method. The system boots to an input screen where the user types a valid serial number for the target system. Instead of a serial number, some other identifier could be used such as the customer invoice or the customer name and address. Galileo (a server) then locates the bill of materials for the target system and generates the necessary test files and tables. The latest version of Auto Test is copied to the target system, and the system is set up to automatically start configuring Galileo once Windows has loaded. When completed, if any hardware was added to the system to connect to the network, the system is powered down and the hardware is removed so that Windows does not load drivers for hardware that does not belong to the system. The system is then booted to Windows where a final configuration by Galileo is set up. When finished, a message box is displayed indicating to the user that setup is now complete.

In a specific implementation, the test suite is Auto Test, a Gateway proprietary product. Auto Test is a globally automated testing tool used at various Gateway and Gateway contracted manufacturing facilities that produce personal computers. The testing tool is primarily used as a final outbound system level test under Microsoft Windows environment.

The testing tool allows the usage of supplier provided, general functional, and application specific diagnostics.

The general manufacturing process may be a fully automated solution for loading, installing, and executing a test suite such as Auto Test on the production floor, yielding higher productivity. Custom Integration Services (CIS) benefits from this higher productivity on the production floor. Nevertheless, the processes and procedures for configuring the test suite per CIS order are manual and lengthy.

The present invention identifies and automates the manual intervention in the existing processes, yielding higher productivity in configuring a test suite per CIS order. The present invention may use a user interface to permit a user to enter an identifying piece of information which causes the call up of a bill of materials particular to the identifying piece of information. This may be the serial number of the device under test.

The following explanation of an embodiment of the present invention involves the use of data flows between entities. Entities may be a hardware device or component or software. The data flows are triggered by an end user installing a network interface card (NIC) and preparing the UUT for setup by performing operations such as connecting power cables and booting the UUT via a test suite CD. The term, bill of materials (BOM), refers to a list of subassemblies and components, including the quantity of each, which are placed in a unit under test device. The subassemblies may be hardware, software, firmware, or a combination of these.

FIG. 1 shows a flow chart of user operations during the loading and installation of the test suite. FIG. 2 shows the automatic processing steps. Initially, the user accesses an interface such as a Graphical User Interface and inputs various data such as an identifier corresponding to the Unit Under Test, step 10. The identifier may be the serial number of the Unit Under Test, step 15. The identifier is received, step 40. A Bill of Materials is retrieved from a storage medium such as IT server 140 using the identifier, step 50. Test files and other files specific to the Bill of Materials are then generated, step 60. The test files and other files are then copied to the Unit Under Test, step 70. A load and installation library is then automatically configured into the operating system, step 80. After step 80, the user is provided with a system installation completion prompt in the message box on the display screen, such as in the graphical user interface, step 20. At this point, the user may safely remove the connection hardware, step 30, assuming the system is powered down.

Figure 3:
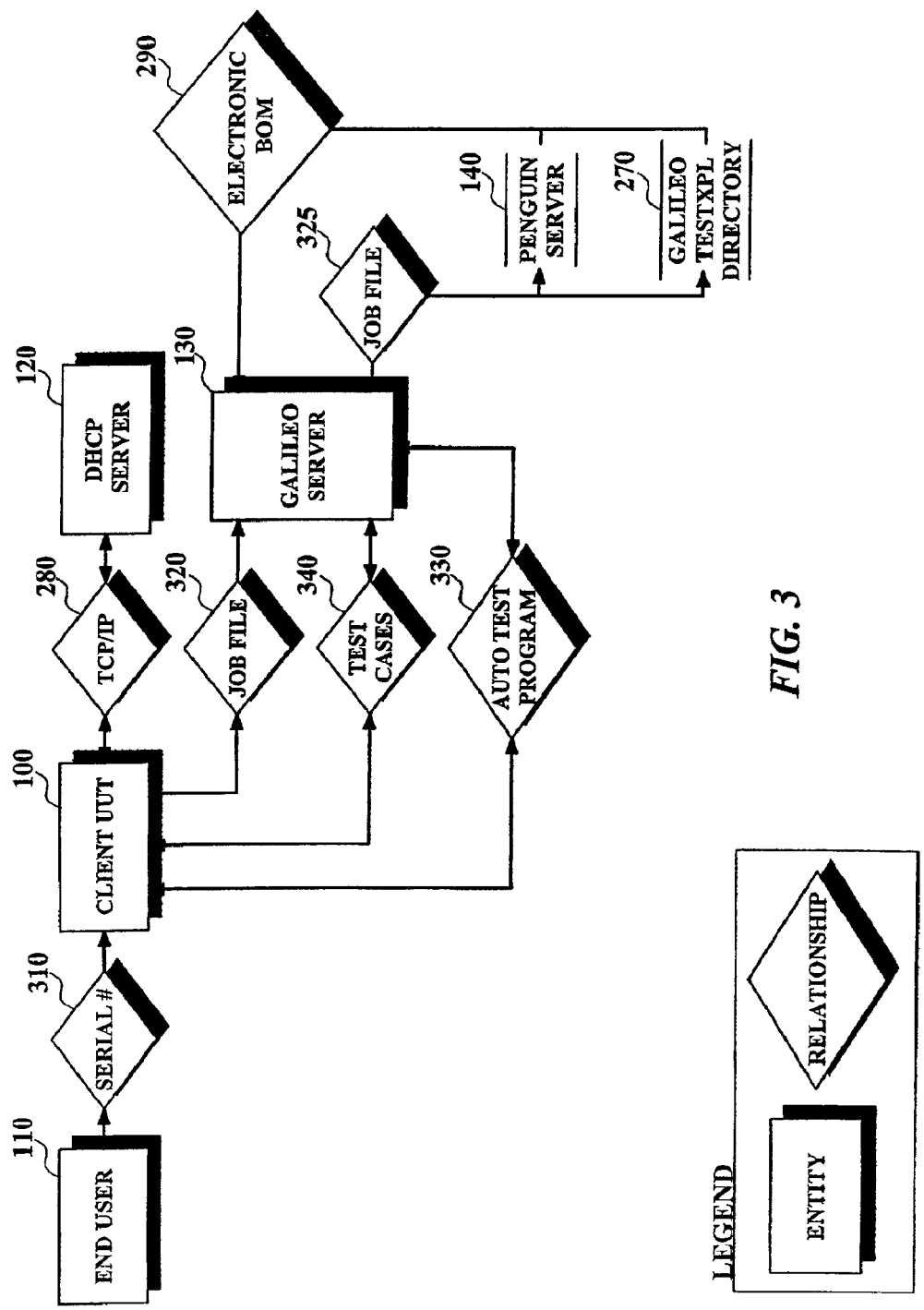
FIG. 3 illustrate a context level data flow.

In FIG. 3, when the UUT boots, the operating system, such as a Microsoft DOS 7.0 operating system, is loaded, creating a RAMDRIVE to help minimize memory restrictions encountered in the DOS environment. The UUT must have a unique identifier to communicate on the network. For this purpose, a random number may be generated, labeling the UUT uniquely to the network using ATCIS format, a random number format. The test suite CD may detect and load CDROM/DVD drivers so that the CD is available in the DOS environment. The CDROM/DVD drive may have a default label, such as Q:/.

Figure 9:
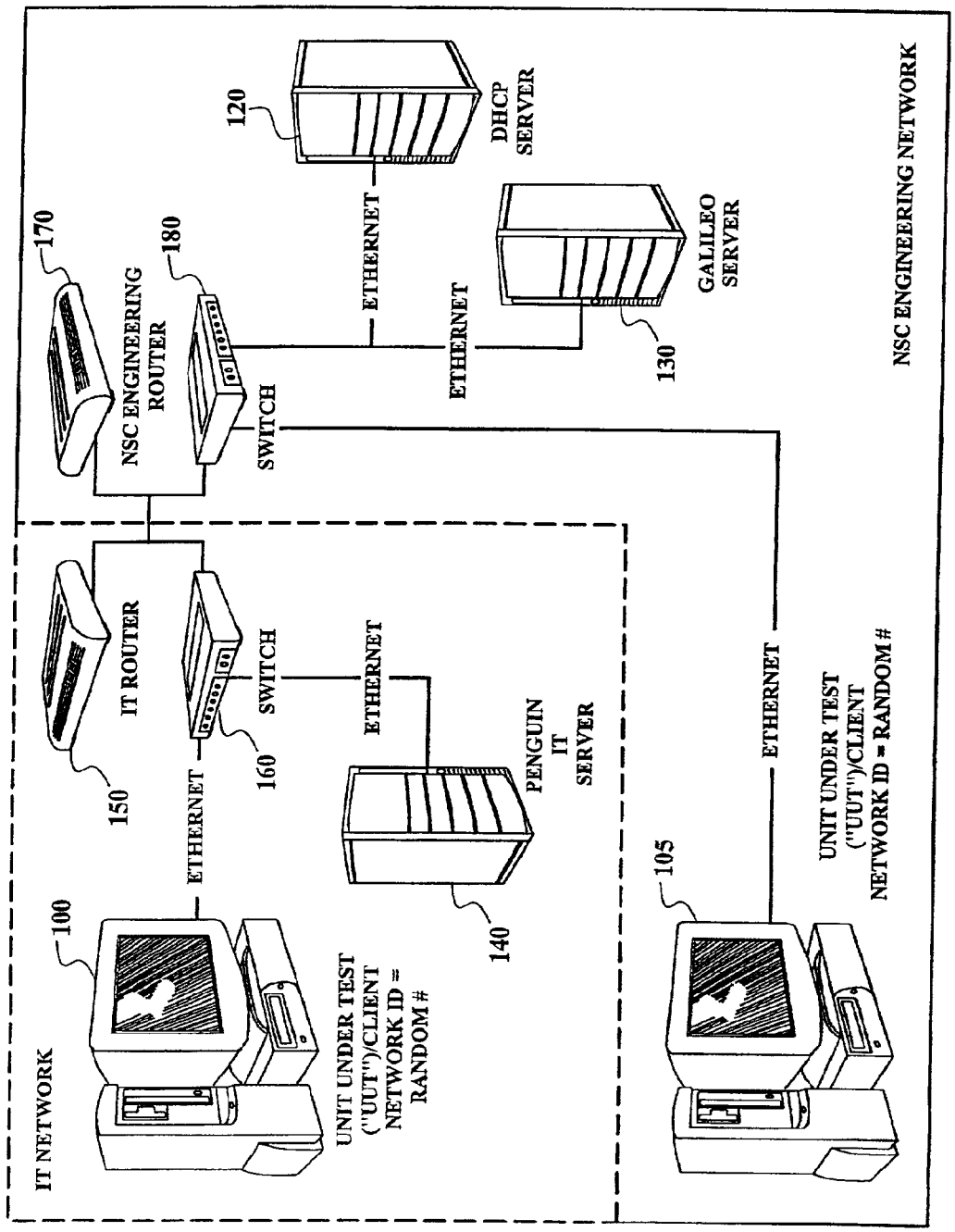
FIG. 9 illustrates a network diagram.

As shown in FIG. 9, the NIC card is identified and the appropriate NIC drivers are loaded to allow communication between the UUT and test suite server. The UUT and test suite server may, in an embodiment, be required to support TCP/IP protocol and the UUT may be made accessible to a DHCP server. Dynamic Host Configuration Protocol (DHCP) provides a framework for passing configuration information to hosts on a TCPIP network. The UUT 100 is a client which may work outside the NSC Engineering Network or may reside in the engineering network. The client must be able to obtain a TCP/IP address from a DHCP server and have a physical link to NSC Engineering Network. Communication may be through Ethernet or other data standard. In the NSC Engineering Network, the client UUT 105 boots to CD, loading the NIC and TCP/IP protocol. TCP/IP protocol requires DHCP server processing. A server 120 on the NSC Engineering Network will respond to DHCP requests for clients on the NSC Engineering Network. The MAX leases required at any one time may be 30, or it may be a higher number. The test suite server 130 is responsible for generating test cases and loading. The test suite server 130 stores the installation package and installation procedure. In one embodiment, it does not push, i.e., initiate installation of the test suite on the client.

Once the NIC is detected and the appropriate drivers are loaded, the test suite CD identifies the network and obtains a valid TCP/IP address from the DHCP server.

If network communication is established and the UUT and test suite server are able to communicate successfully, the end user is prompted to enter a valid serial number. If communications cannot be established, the end user will be notified immediately.

In FIGS. 4A and 4B, data flow is depicted before and after the operator enters a serial number. The serial number may be of several letters, numerals, or alphanumeric characters. For example, the serial number may be of ten numerical digits. The serial number may be posted to the test suite server for processing via a job file.

Figure 5A:
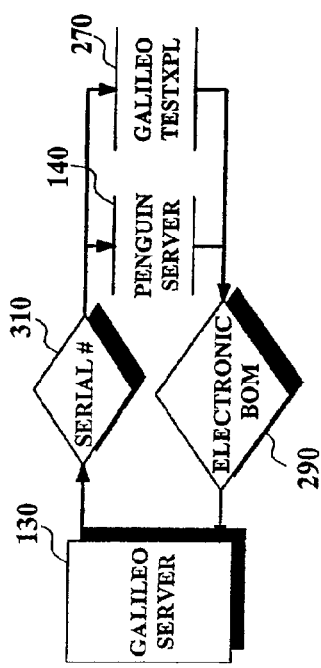
FIGS. 5A and 5B illustrate data flow of the electronic Bill of Materials.
Figure 5B:
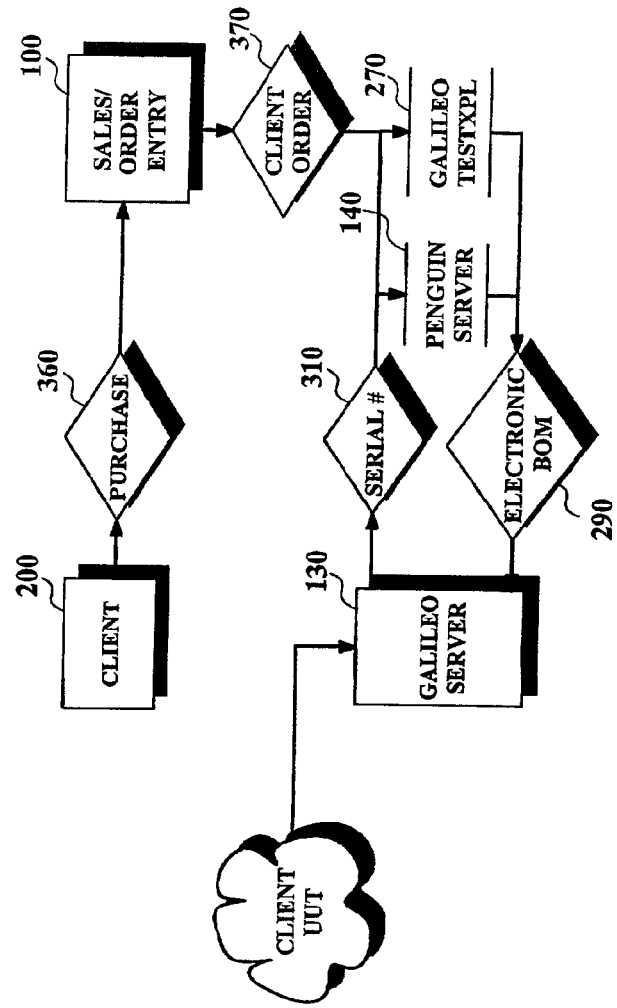

In FIGS. 5A and 5B, the test suite server communicates with server 140 (e.g., a Penguin or other IT server). The server 140 houses the electronic bill of materials which is utilized to configure each UUT uniquely for the test suite with respect to test cases. If it is unable to locate a valid BOM on the server 140, and the appropriate INI (initialization file) entries are set, the test suite server searches the TestXPL directory for XPL (extended parts list) files uploaded via the web, such as the test suite's web site. For example, a modem functionality test would not be performed on a UUT having no modem in the BOM because the result leads to an inaccurate failed unit. The custom test case files are linked to the electronic BOM, also known as an XPL file.

In an embodiment, the test suite TestXPL is a data store for manual xpl storage, manipulation and testing. For use with systems whose xpl is not live. The sales transaction between the client and the sales representation is entered into a sales data repository. The format of the data is defined by IT and its transactional servers. The server 140 is a data repository of client sales transactions uniquely identified by a system serial number. The server 140 is available to manufacturing and engineering servers via a software interface. The electronic BOM resides as an ASCII file uniquely identified by the system serial number. The filename is defined as system serial number .xpl, limited to the DOS 8.3 naming convention. The file may contain a list of part numbers to be used in assembling the computer system, which is later used to generate system specific test cases for the test suite.

Figure 6A:
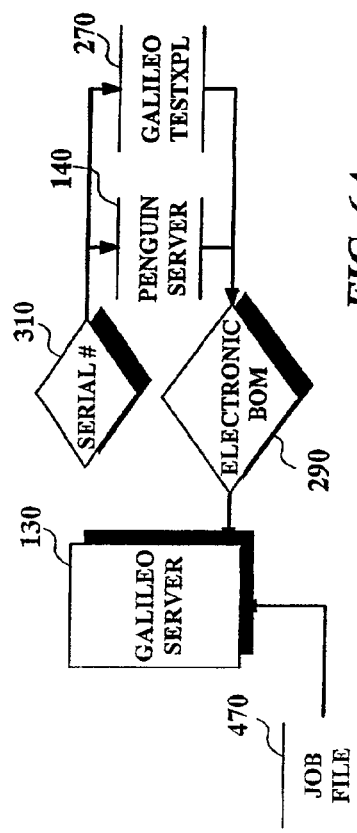
FIGS. 6A and 6B illustrate the data flow of a GALILEO server.
Figure 6B:
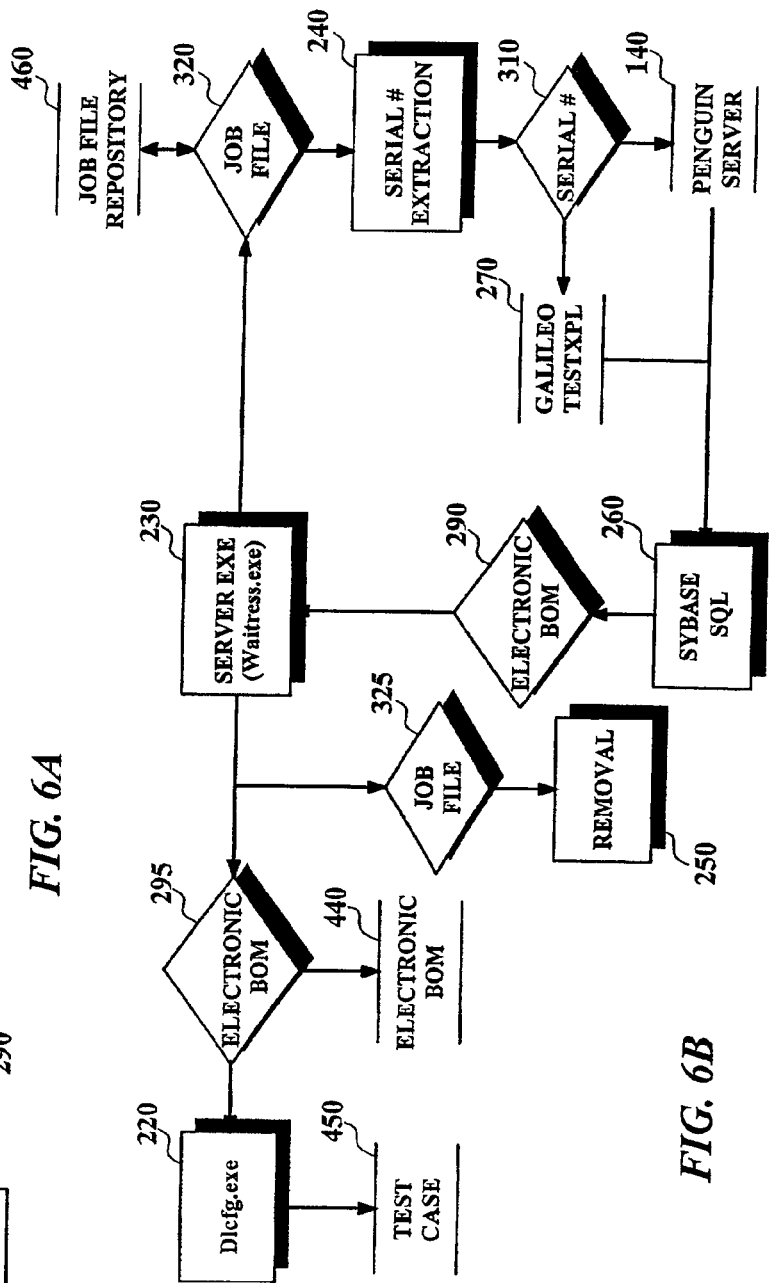

FIGS. 6A and 6B depict the test suite server's interaction with the various entities. The test suite entity houses the test case files per serial number and the released production image of the test suite.

The ATcfg.exe utility allows the electronic BOM to be transformed into test cases that are specific to the UUT's configuration. The waitress.exe utility performs a forever loop looking for job files every second. The serial number is extracted from the job file and posted to the server 140 for processing via an ALTOS or other library function call, SQL or other queries, and TCP/IP connection. If not found on the server 140, the search moves to the test suite TestXPL.

Once the test case files are created and stored to the test suite server, the test suite is loaded and installed to the UUT via the network connection.

The load process occurs in the DOS environment. After load completion, the end user is prompted to remove the test suite CD and reboot the UUT into the Windows environment. The image extraction is processed upon the first Windows boot, installing the test suite, and its test case files, much the same as the general manufacturing environment.

The end user is notified the UUT is completed when a message box appears stating the test suite has been installed.

The UUT is now ready to be validated against the test suite diagnostic tool. The entire process is completed in 3 minutes or less.

Figure 7B:
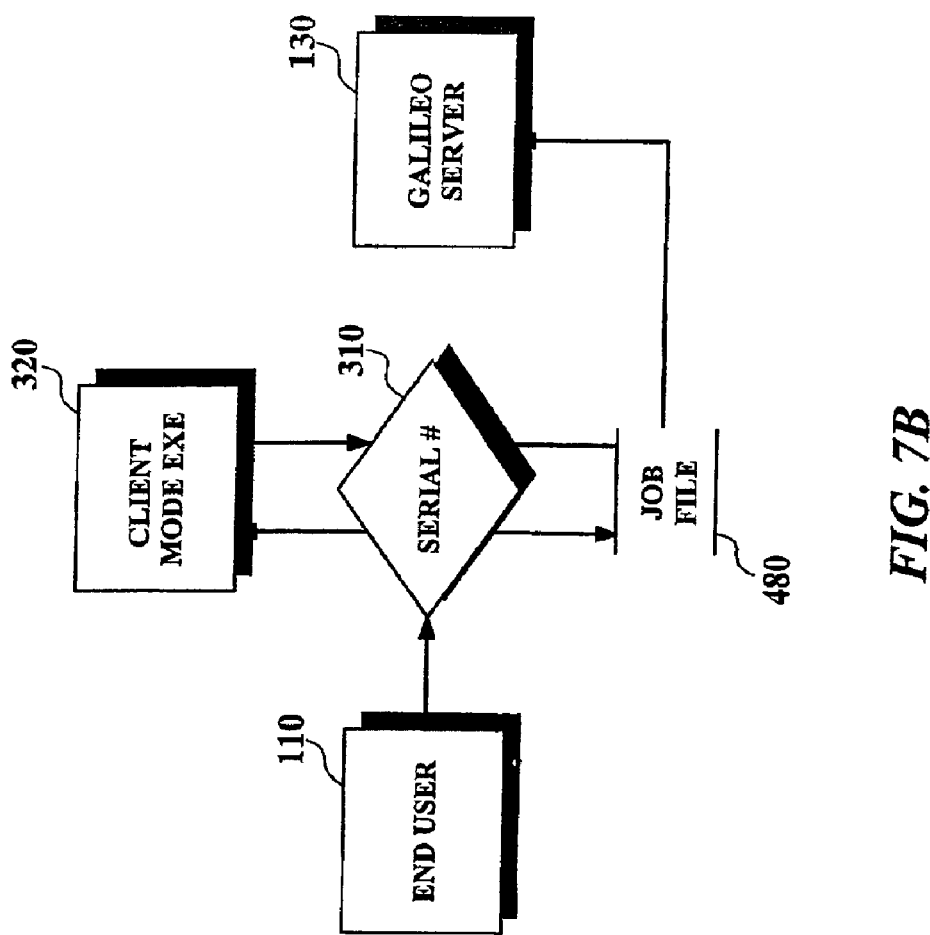
FIGS. 7A and 7B illustrate data flow of a job file.
Figure 7A:
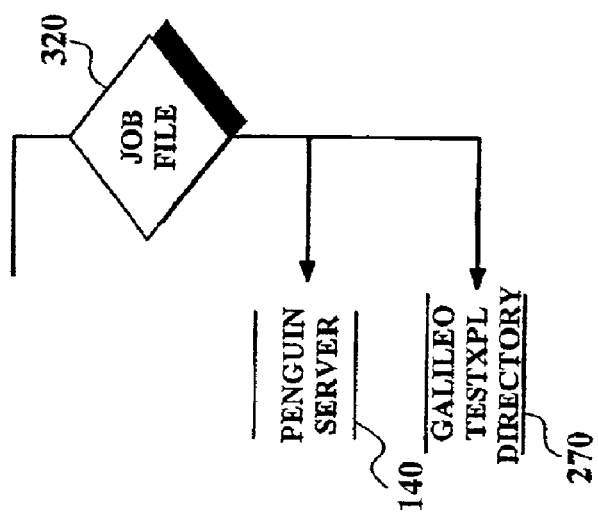

FIGS. 7A and 7B illustrate the usage of the job file. The job file may be created by a client application (e.g., client.exe) using the input of the operator. The job file may be an ASCII file containing the system serial number of the client UUT to be configured for the test suite. The job file may be fed to the test suite server for processing. The test suite server may be configured to accept a maximum number of queue jobs; perhaps 100, perhaps 1000.

Figure 8A:
FIGS. 8A and 8B illustrate data flow of an Auto Test installation.
Figure 8B:
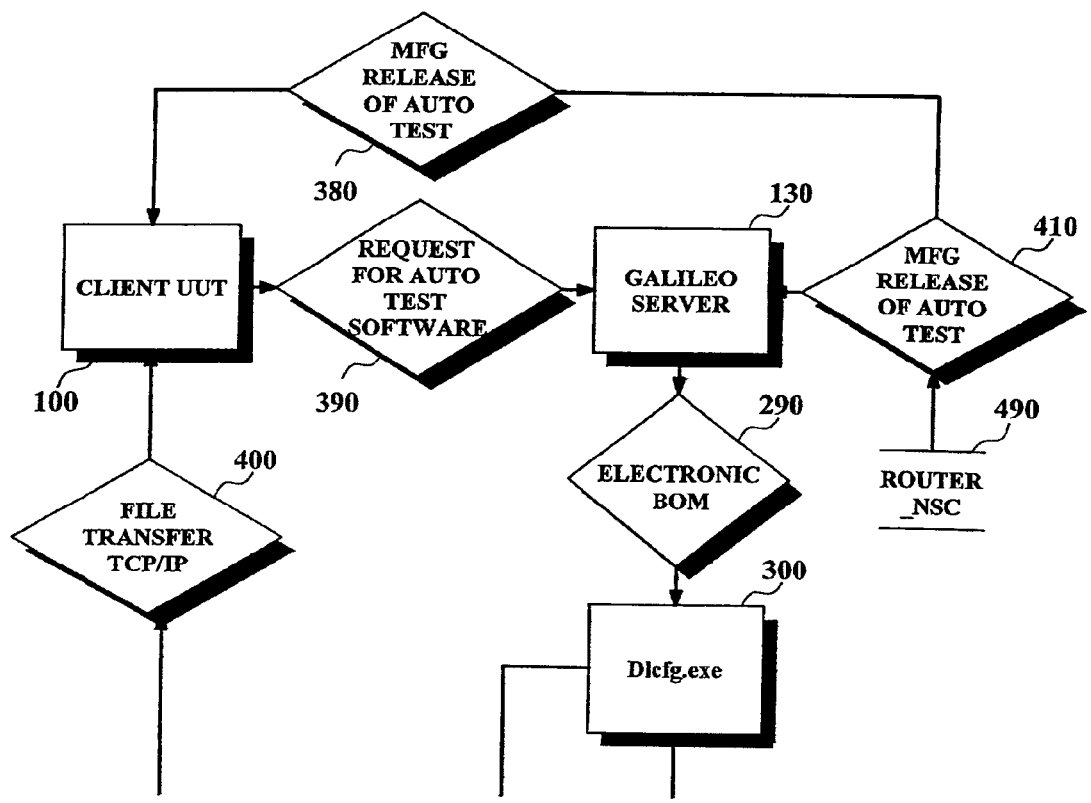

FIGS. 8A and 8B illustrate the data flow of the test suite installation.

In an embodiment, a network interface card (NIC) is connected to a network. The NIC is used as a communication device between UUT and GALILEO server.

The present invention may be set up to support all Microsoft shipping operating systems. It may be set up to work on 50% of CIS orders in phase one and 90% of CIS orders in phase two. It may be used to create an architecture that can be utilized through regions, e.g. EMEA (Europe/Middle East/ Africa) and APAC (Asia Pacific). It may use a BIOS that supports CDROM/DVD devices as boot devices, TCP/IP protocol. Operator messaging may be limited to certain specified rules such as go/pass messages are in light gray, stop/fail messages are in red, and caution messages are in yellow. The present method supports at least a 10/100 MB network.

It is believed that the automated method for installing and configuring a test suite on a unit under test of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of installing and configuring a test suite for a unit under test device, comprising:

receiving an identifier which uniquely identifies the unit under test device;

installing and configuring test flies for the unit under test device in which the test files are determined by the identifier;

retrieving a bill of materials for the unit under test;

generating test files and tables specific to the bill of materials;

copying the test files and other necessary files to the unit under test device;

loading and installing a library automatically configured into an operating system, and sending a system installation completed prompt to a user wherein the prompt appears in a message box on a computer accessed by the user and the user removes the connection hardware.

2. The method of claim 1, wherein the identifier causes the retrieval of a bill of materials for the unit under test device.

3. A system for configuring a unit under test device using a network, comprising:

a first unit under test device;

a first server communicatively coupled to the first unit under test device; and a test suite server on a first network which communicates with the first server and the first unit under test device, the first unit under test device and the first server not being on the first network, wherein a user inputs an identifier, the identifier being used to retrieve a Bill of Materials for the Unit Under Test device.

4. The system of claim 3, wherein the identifier is a serial number.

5. The system of claim 3, further comprising a second unit under test device.

6. The system of claim 5, wherein the second unit under test device is on the first network.

7. The system of claim 6, wherein the first and second unit under test devices and the first server and test suite server communicate through Ethernet.

8. The system of claim 6, further comprising a Dynamic Host Configuration Protocol (DHCP) server.

9. A system for configuring a unit under test device using a network, comprising:

a first unit under test device;

a second unit under test device;

a Dynamic Host Configuration Protocol (DHCP) server;

a first server communicatively coupled to the unit under test device; and a test suite server on a first network which communicates with the first server and the first unit under test device, the first unit under test device and the first server not being on the first network, wherein the second unit under test device is on the first network.

* * * * *